Oct. 21, 1930.    G. A. LONG, JR    1,779,324
PHOTOMETRIC APPARATUS
Filed Aug. 9, 1926
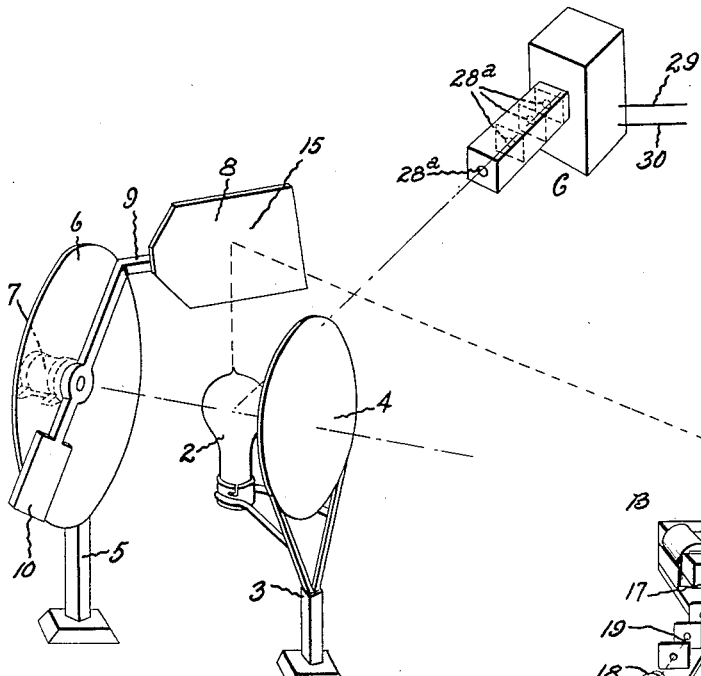
Fig.1.
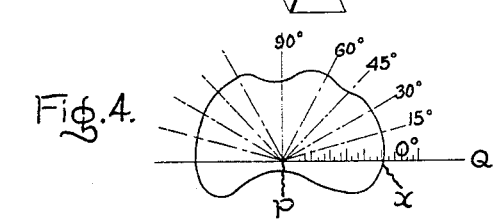
Fig.4.
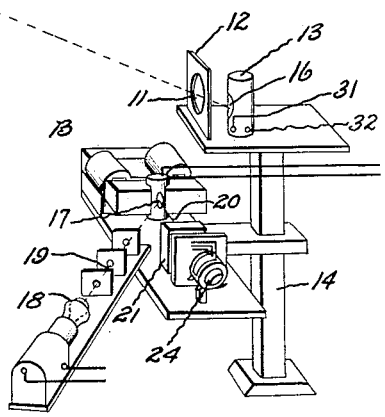
Fig.3.
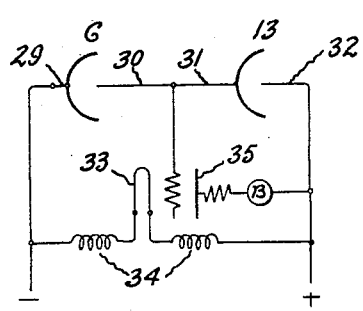
Fig.2.
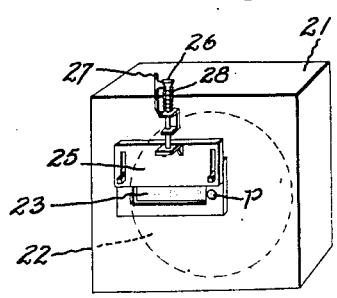
Inventor:
Geary A. Long, Jr.,
by
His Attorney.

Patented Oct. 21, 1930

1,779,324

UNITED STATES PATENT OFFICE

GEARY A. LONG, JR., OF BALTIMORE, MARYLAND, ASSIGNOR TO GENERAL ELECTRIC COMPANY, A CORPORATION OF NEW YORK

PHOTOMETRIC APPARATUS

Application filed August 9, 1926. Serial No. 128,044.

My invention relates to a recording photometric device. More particularly, my invention relates to a device of the above character which is adapted to plot a candle power distribution curve.

One of the objects of my invention is to provide a device by means of which a candle power distribution curve of a lighting unit is photographically plotted with respect, for example, to a polar coordinate. Another object of my invention is to employ a device of the above character in which one or more photo-electric cells are employed.

The principles of the invention will be more readily understood from the following specification, drawing, and claims, in which drawing Fig. 1 is a diagrammatic perspective representation of a device involving the principles of my invention; Fig. 2 is a diagrammatic, schematic, layout of the circuit connections showing the relation of the photoelectric cells to each other and to an electronic tube; Fig. 3 is an enlarged diagrammatic perspective view of the element associated with the oscillograph carrying the negative plate for recording the operations of the oscillograph; Fig. 4 is a diagrammatic representation of a light distribution curve such as would be obtained by my invention.

Referring more in detail to the drawing, it will be seen that a lighting unit 2, which, in the drawing, is represented as an incandescent lamp, is mounted on a suitable support 3 behind a screen element 4. The object of the screen element is to cut off the direct rays from other portions of the apparatus, which are shown in the right hand section of the drawing. On the opposite side of the light source 2, with respect to the screen 4, there is a structure having a pedestal 5 on the upper portion of which there is located, in a vertical plane transverse an axis passing through the light source 2, a dial plate 6. Mounted on this structure to rotate about said axis there is a mirror 8. This mirror is secured to the arm 9 and is counterbalanced by a weight 10 on the opposite side of the axis with respect to the mirror 8. This arm 9 is mechanically connected with the armature of a motor 7, which is located behind the plate 6.

Off at a distance to the right and behind the screen 4 along the axis passing through said light source there is mounted a photo-electric cell 13 behind a screen 12, which screen is provided with an opening 11. The cell and the screen are mounted upon a pedestal 14. The mirror 8, when the motor 7 is in operation, rotates about the light unit 2, with its center 15 revolving about a circle in a plane passing for example through the center of the lighting unit 2, parallel with the screen 4. For convenience the circle described by the mirror 8 may be considered as a focalizing path, in the focal region of which the cell 13 is located. The location of the photo-electric cell 13 and of the screen 12 is such that if the eye of an individual were substituted for the eye 16 of the photo-electric cell, the light unit 2 would be visible during the complete revolution of 360° of the mirror 8 about its horizontal axis of rotation. The object in providing the mirror 8 and in rotating the mirror is to avoid the necessity of rotating either the unit 2 about the cell 13 or the photo-electric cell 13 about the light unit. The object of the apparatus is to have the photo-electric cell 13 detect the intensity of light from the unit 2 at every point of the circle through which the center of the mirror 15 rotates. In connection with the apparatus thus described, I also provide an oscillograph B of the ordinary type, the oscillating mirror 17 of which is clearly shown. In apparatus of this sort a source of light 18 is provided which sends a beam of light indicated by the light 19 to the mirror 17. This beam of light is reflected back along the line 20 to a negative plate in the housing 21, Fig. 1. This negative plate and housing are more clearly indicated in Fig. 3. Within this housing the negative plate 22 is indicated by a dotted circle. This negative plate is clearly visible through the window 23 in the housing 21, which is indicated as being open in Fig. 3. The beam of light 20 passes through the window 23 and strikes the negative plate 22. This negative plate is mounted on a shaft and adapted to be rotated by a motor 24, see Fig. 1. As shown in Fig. 3, associated with the window 23 there is a shutter 25, which is under the control of the button 26. If it is desired to close the window 23, the button 26 is depressed. This button then catches under the latch 27, thereby holding the shutter 25 over the window 23, thus cutting off the beam 20 from the negative plate 22. If it is desired to open the window 23, the latch 27 is drawn to one side, left for example, with the result that the spring 28 raises the button 26 and, therefore, also raises the shutter 25, thereby opening the window 23 and exposing the negative plate 22 to the beam 20.

Associated with the equipment thus described, I also provide a second photo-electric cell C, similar to the photo-electric cell 13. The arrangement is such that a direct beam of light from the light source 2 passes through the opening 28ª and strikes the eye of the photo-electric cell C.

In Fig. 2 I have shown diagrammatically a circuit arrangement in which the photo-electric cells C and 13 are indicated. The photo-electric cell C in Fig. 1 is provided with a pair of conducting leads 29 and 30, while the photo-electric cell 13 is provided with a pair of conducting leads 31 and 32. Furthermore, across the conductors 29 and 32 I provide a source of potential, the negative terminal of which is connected to the conductor 29 and the positive terminal to the conductor 32. Bridged across the conductors 29 and 32 is the filament 33 of an electronic tube. In series with the filament 33 I provide resistance means 34 for regulating the amount of current flow through the filament. The electronic tube is of the three-element type and, as shown, the plate element 35 is connected to the conductor 32 through the oscillograph B. The third, or grid, element of the tube is connected between the photo-electric cells C and 13. Therefore with this arrangement, if the same amount of light falls on the cells C and 13, the oscillograph B will remain quiescent, but if the amount of light which is thrown on the cell 13, for example, should be greater or less than the amount striking the cell C, the oscillograph B will move either in one direction or the other and, therefore, the beam 20 will consequently move. Therefore, it will be seen that by rotating the mirror 8 in Fig. 2, the amount of light that strikes the photo-electric cell 13 will vary, and therefore, the oscillograph will oscillate accordingly.

The arrangement which I have proposed is such that the motors 7 and 24 will run in synchronism. After the motors are running, if the shutter 25 in front of the negative plate 23 is opened, the curve will be plotted on the negative plate 22 about the center of rotation of the negative plate, which in this case may be considered as the center of a system of polar coordinates. As soon as the mirror 8 has performed one or more revolutions in conjunction with the negative plate 22, the button 26 is pressed and the beam 20 cut off. The negative plate 22 may then be removed and developed in the usual manner, and it will be found that due to the exposure of this plate to the beam 20 a photometric curve about the center of the negative plate will have been recorded.

It will be observed that both photo-electric cells are supplied with light from the same source, thereby avoiding any possibility of error which might arise if the photo-electric cell C, for example, were supplied with a light beam from some standard source, the rays from which might be different from the rays produced by the lighting unit with the result that a correct determination of the light emitted by the source 2 would be impossible. This would be the case, for example, if the light source in the unit 2 were tungsten and if the separate light source for supplying the photo-electric cell C were carbon.

By referring to Fig. 1 of the drawing the position of the mirror 8 about its circuit of revolution can be determined at any time by the dial plate 6. The plate upon which the negative 22 is mounted is also provided with a dial, as well as the negative plate itself. With the proposed arrangement, the negative plate is always mounted in position with its dial markings corresponding to the dial markings upon the plate which supports it. Furthermore, the dial markings on the plate that supports the negative correspond with the dial markings on the dial plate 6. The result is that when the mirror 8 is in the zero position, for example, the beam 20 will be striking the negative plate 22 in the zero position. The result is that an accurate reading can be made from the negative plate of the light distribution about the light unit 2.

After the curve is produced on the negative plate, then it becomes necessary to calibrate the curve thus produced. This is done by substituting for the photo-electric cell 13 an eye photometer. A reading is then taken with the mirror 8 in any particular position, the zero position for example. Assuming that the eye photometer gives a reading of 500 C. P., then obviously the reading at the point X in the curve, Fig. 4, will be 500 C. P., that being the case, the distance from the center P along the line PQ is laid off as indicated in Fig. 4, the distance being equally spaced off between P and X, and each one of the distances, assuming that the spacing is 5, will represent 100 C. P. Obviously, therefore, by drawing a series of circles about the point P, corresponding to the divisions, the candlepower of the light unit 2, corresponding to any position of the mirror 8, can be accurately ascertained.

While I have elected to illustrate my invention in connection with a specific form of apparatus and in connection with a method comprising certain specific steps, it will be understood that I do not wish to be so limited inasmuch as I contemplate modifications and variations within the spirit of the invention suggested by the disclosure and falling within the scope of the claims contained herein.

What I claim as new and desire to secure by Letters Patent of the United States, is:

1. In a recording photometric device, a light source, a light-sensitive cell, a reflector mounted to rotate about the light source, a motor device for rotating the reflector with respect to the light source said cell being so located and said reflector being so mounted as to maintain the light projected by the reflector during its movement directed upon the cell, and means responsive to the cell for permanently recording the strength of the light along the path of the reflector.

2. In a recording photometric device, a light source, a light-sensitive cell, a reflector, a motor device for moving the reflector with respect to the light source and for maintaining the light projected by the reflector during its movement directed upon the cell, and means responsive to the cell for recording the strength of the light along the path of the reflector, said means comprising a sensitive photographic element and a motor device for moving said element, both of said motors being timed to operate in synchronism.

3. In a recording photometric device, a lighting unit, a photo-electric cell, a reflector mounted to rotate about said lighting unit, a motor for rotating the reflector, said cell and said reflector being placed in such relation to the light source that light from the lighting unit which strikes the reflector at any point along its path is projected to the cell, an oscillograph responsive to the cell and a photographic element mounted to rotate with respect to and across the path of the oscillating beam of the oscillograph, a motor device for rotating said photographic element, and means for preserving said motor elements in synchronism.

4. The method of plotting the candlepower of a lighting unit along a given path about the unit on a photographic element, which consists in subjecting a photo-electric cell to the light of the unit along said path and causing an oscillograph to respond to the cell in response to the light along said path, and subjecting a moving photographic element to the beam of the oscillograph.

5. The method of plotting the candlepower of a lighting unit along a given path about the unit on a sensitive photographic element, which consists in moving a reflector along a path about the light source to project the light from along said path to a photoelectric cell to render the cell responsive to the light along said path and causing an oscillograph to respond in turn to the cell as the cell responds to the light and subjecting a moving sensitive photographic element to the beam of the oscillograph element while the motions of the photographic element and of the reflector are preserved in synchronism.

6. The method of plotting the candlepower of a lighting unit along a given path about the unit on a sensitive photographic element, which consists in moving a reflector with respect to the lighting unit and directing the light reflected during the movement upon a photo-electric cell, controlling an oscillograph through the medium of said photo-electric cell, and causing the beam of the oscillograph thus controlled to be recorded upon a moving sensitive photographic plate.

7. The method of plotting the candlepower of a lighting unit along a given path about the unit on a sensitive photographic element, which consists in moving a reflector with respect to the lighting unit and directing the light reflected during the movement upon a photo-electric cell, controlling an oscillograph through the medium of said photoelectric cell, and causing the beam of the oscillograph thus controlled to be recorded upon a moving sensitive photographic plate, the movements of the reflector and of the photographic element being preserved in synchronism.

8. In a recording photometric device, a light source, a moving reflector within the field of the light source, a photo-electric cell responsive to the light projected by the reflector during the movement of the reflector, an oscillograph responsive to the photo-electric cell while under the influence of said light, and a sensitive photographic element, said element being mounted to move with respect to the beam of the oscillograph, and means for causing the movement of said photographic element whereby the oscillations of the oscillograph may be recorded and preserved as a record of the intensity of the light along the path of the reflector.

9. The method of plotting the candlepower of a light source on a sensitive photographic element, which consists in exploring the light along a path through the medium of the photo-electric cell, operating an oscillograph through the medium of the photo-electric cell during the exploration, and projecting the indicating beam of the oscillograph upon the photographic element while the latter is in motion to produce a record of the light along said path upon the photographic element.

10. In combination, a reflector, means for moving said reflector along a focalizing path with respect to a light source whereby the light reflected by said reflector along said path is directed to a focal region, a photoelectric cell located in said region to receive said reflected light, an oscillograph electrically connected with said cell and under the control of the latter, a photographic plate and means for rotating said plate in the field of the beam of the oscillograph about an axis transverse the plate whereby the oscillations of the oscillograph may be recorded about the point where the plate and the axis meet and a record preserved of the intensity of the reflected light along the path of the reflector.

11. In a photometric device, in combination with an oscillograph, a pair of photo-electric cells, said oscillograph being under the opposing control of said cells and means for applying constant light from a given source to one cell and applying variable light from the same source to the other cell whereby the beam of the oscillograph may be caused to move.

12. In a recording photometric device, an oscillograph, said oscillograph being under the opposing control of two photo-electric cells, means for applying a constant light from a given light source to one cell, exploring means and means for moving said exploring means with respect to said light source about a central point and for directing the light from said light source encountered by said exploring means in its path to the other photo-electric cell whereby any variation of light along the path of the exploring means will cause the beam of the oscillograph to move, a photographic plate located in the path of the beam of the oscillograph, and means for rotating said plate about a point in the path of said beam, the means for rotating the plate and the means for rotating the exploring device being maintained in synchronism.

In witness whereof, I have hereunto set my hand this 5th day of August, 1926.

GEARY A. LONG, Jr.